United States Patent [19]

Tholome

[11] 4,182,980

[45] Jan. 8, 1980

[54] METHOD AND APPARATUS FOR CONTROLLING AUTOMATIC EQUIPMENT FOR SPRAYING COATING PRODUCTS

[75] Inventor: Roger Tholome, Corenc Montfleury, France

[73] Assignee: Air Industrie, Courbevoie, France

[21] Appl. No.: 686,874

[22] Filed: May 17, 1976

[30] Foreign Application Priority Data

Jun. 17, 1975 [FR] France ............................... 75 19297

[51] Int. Cl.[2] ......................... H02P 1/04; H02P 3/00; H02P 7/00

[52] U.S. Cl. .................................... 318/467; 318/626; 318/282

[58] Field of Search ............... 318/467, 282, 626, 627, 318/119, 127, 128

[56] References Cited

U.S. PATENT DOCUMENTS

| | | | |
|---|---|---|---|
| 2,237,373 | 4/1941 | Sinclair ............................... | 318/282 |
| 2,285,666 | 6/1942 | King .................................... | 318/282 |
| 3,704,405 | 11/1972 | Miller, Jr. et al. .................... | 318/467 |
| 3,774,093 | 11/1973 | Harken et al. ........................ | 318/282 |
| 3,794,901 | 2/1974 | Gendreu et al. ....................... | 318/282 |

*Primary Examiner*—B. Dobeck
*Assistant Examiner*—Eugene S. Indyk
*Attorney, Agent, or Firm*—Brisebois & Kruger

[57] ABSTRACT

Method and apparatus for controlling variations in position of automatic equipment for spraying coating products, such as, for example, automatic sprayers of paints, enamels, fibres, etc., mounted on reciprocators which give them a to-and-fro movement. The carriage carrying the sprayer also carries springs which strike the stops at the end of the path of travel. While the said springs are being compressed and released, the electrical supply of the motor is cut off by limit switches.

18 Claims, 12 Drawing Figures

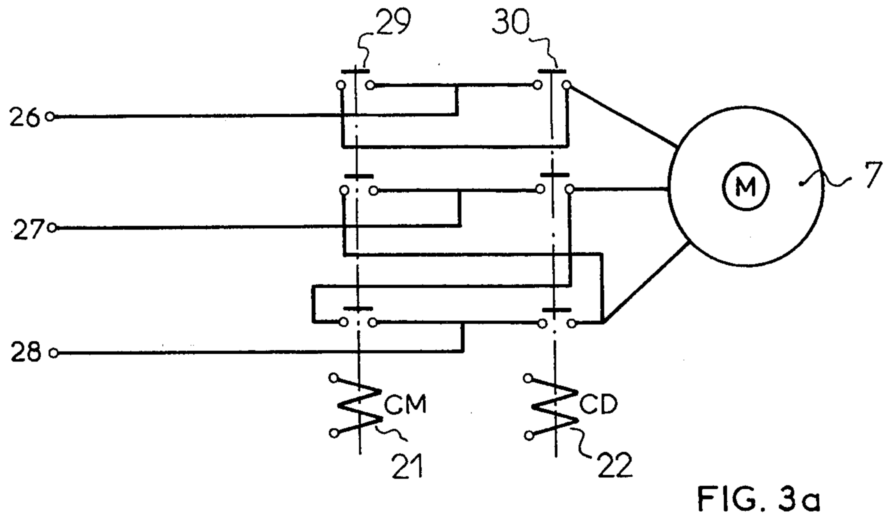
FIG. 3a
FIG.3b
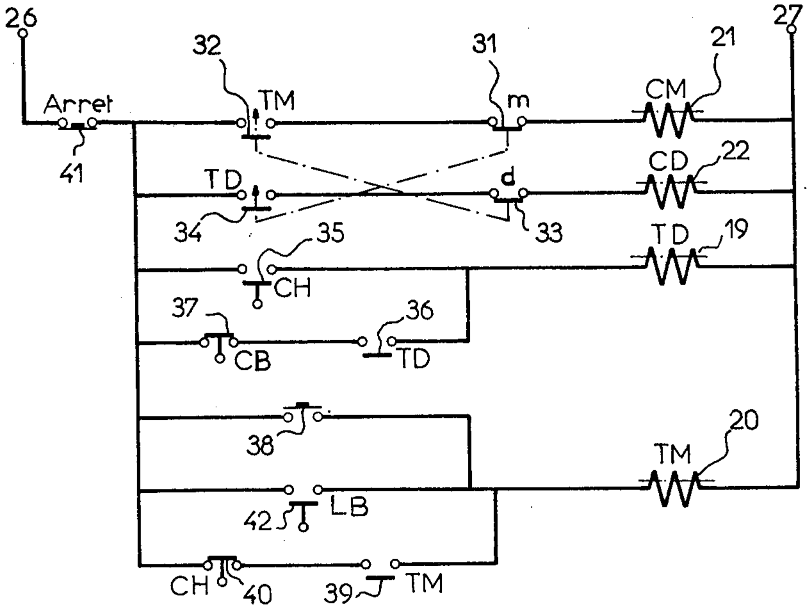

METHOD AND APPARATUS FOR CONTROLLING AUTOMATIC EQUIPMENT FOR SPRAYING COATING PRODUCTS

The present invention relates to controlling variations in position of automatic equipment for spraying coating products, such as, for example, automatic sprayers of paints, enamels, powders, fibres, etc., mounted on reciprocators which give them a to and fro movement.

In an automatic coating installation, ths sprayers of coating product are often, in fact, given a reciprocating, rectilinear, to and fro movement. For this, each moving unit can be manoeuvred by a linear, electric, pneumatic or hydraulic motor, or else a rotary, electric, pneumatic or hydraulic motor can be used, and the rotating movement changed into a rectilinear one.

In the former of these two groups of solutions, the electric linear motor is practically inconceivable now, essentially because of its cost, its speed, which is too high, and problems of changing direction; the pneumatic motor, or jack, is a simple and cheap solution, but it lacks precision, on account of the elasticity of the air; the hydraulic motor, or jack, is a reliable and accurate solution, but a costly one, for it requires a supply unit under high pressure.

In the second of these two groups of solutions, transformation of the movement is generally carried out by a chain-and-wheel system. If it is then wished to determine the length of the path of travel of the moving unit, it must either be connected alternatively with the upwardly moving and downwardly moving sections of the circulating chain, or the direction of rotation of the motor must be cyclically changed.

The first of these two solutions gives rise to mechanical problems but gives satisfaction with low powers.

The second of these two solutions is at present put into practice either in the hydraulic version, which is again reliable and accurate, but costly, or in the electric version; in the latter case there arise problems of overheating the electric motor during the periods when its direction of rotation is changing. In fact, the change of direction requires the absorption, and then the restitution, of the kinetic energy of the rotating and translating masses. Since the change of direction is fairly rapid, this absorption and restitution of kinetic energy require that the motor should have much greater power than that needed to impart a reciprocating movement to the unit (i.e. generally to overcome the friction, for the moving unit is often equipped with a counterweight). Furthermore, the total duration of the run of the moving unit is not very great compared with the length of time taken for changing direction, with the result that the average current going through the motor is a good deal higher than the nominal current, which causes overheating of the motor. with this system it is thus necessary, on the one hand, to use an overpowered motor, and on the other to provide it with a cooling device, formed, for example, by water circulation.

The aim of the invention is to overcome these drawbacks and thus make it possible to use a rotary electric motor with cyclic change of rotating direction, but of low power and requiring no cooling device. Rather than the said kinetic energies being electrically absorbed and then produced again, these may, according to the invention, be absorbed by elastic elements, such as, for example, mechanical, pneumatic, hydraulic etc. springs and then restored with the help of these same elastic elements. For this, and still according to the invention, at the point of the run where it is wished to begin to slow down the movement (which we will call "approach point"), a spring on the moving unit strikes a stop and, concurrently, the electric supply to the motor is cut off. By inertia of the moving masses, the standstill point is reached, then the masses spring into movement again. When the approach point is reached again, theoretically the speed of the moving unit is, when there is no friction, exactly the same at the approach point as before, but in the other direction, and the electrical supply to the motor can be started up again without there being any over-intensity of current and therefore overheating. Since the motor no longer has to provide the power for a change of direction, a less powerful one may be chosen, just powerful enough to overcome the friction as the moving unit travels along.

If it is wished, a slight time-lag may of course be introduced in one direction or the other between the time at which the spring strikes the stop and the cutting off of the motor's electrical supply; for example, to take the friction into account, the supply may be cut off a little after the approach point and switched on again a little before the latter, or else it may be cut off just at the approach point, but then switched on again a little before it.

The sequences may be regulated in time and space with the help of conventional and accurate electromechanical time-delay devices and contactors.

Furthermore, it is worth pointing out that the invention, as it enables a low-powered motor to be used, makes it possible to avoid using a certain number of safety devices. In fact, should the disconnection device of the motor not function, the said motor, which still goes on being supplied, quite simply gets blocked and disconnects itself at the end of the travel length, without any damage to the associated mechanism. This is not possible with the previous systems, where the thermal relays are over-calculated, and where the high power of the motor would result, when blocked at the end of the travel length, in great damage to the associated driving device, so that extra costly and complex safety devices would be necessary.

The invention will be made clearer with the help of the following description of some working examples, with reference to the annexed drawings, in which:

FIG. 1 shows diagrammatically a first working example of the invention:

FIG. 2 gives a schematic diagram of the electromechanical circuit associated with the device of FIG. 1;

FIGS. 3*a* and 3*b* show the wiring diagram of the electromechanical circuit associated with the device of FIG. 1;

Figure 1:
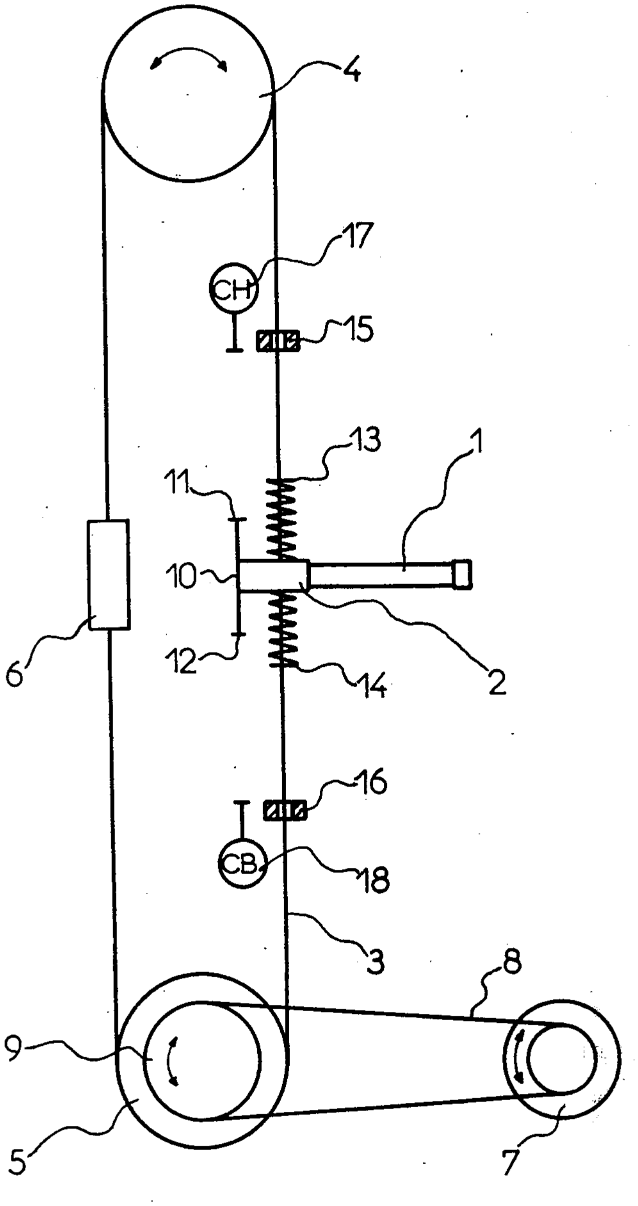

On FIG. 1, numeral (1) refers to a sprayer of coating product, such as a sprayer of paint or powder for coating objects. Numeral (2) refers to the support of sprayer (1), generally called 'carriage', the said support being mobile and given, as known per se, a vertical to and fro movement. To make this movement, the support (2) is carried and moved along vertically by means of a circulating chain (3) passing round an upper wheel (4) and a lower wheel (5), and supporting a counterweight (6)

whose role is to exactly balance unit (1, 2). The wheel (5) is driven by an electric motor (7) through a reducer comprising a belt (8) and reducing wheel (9).

In accordance with the invention, the apparatus comprises in addition the following elements:

a vertical contact bar (10) fixed on the back part of support (2) and equipped with an upper abutment (11) and a lower abutment (12);

two springs (13) and (14) mounted respectively on the upper part and lower part of support (2);

an upper stop (15) and a lower stop (16), whose position can be adjusted;

an upper limit switch (17) and a lower contactor (18), whose positions are dependent, respectively, on those of stops (15) and (16).

Figure 2:
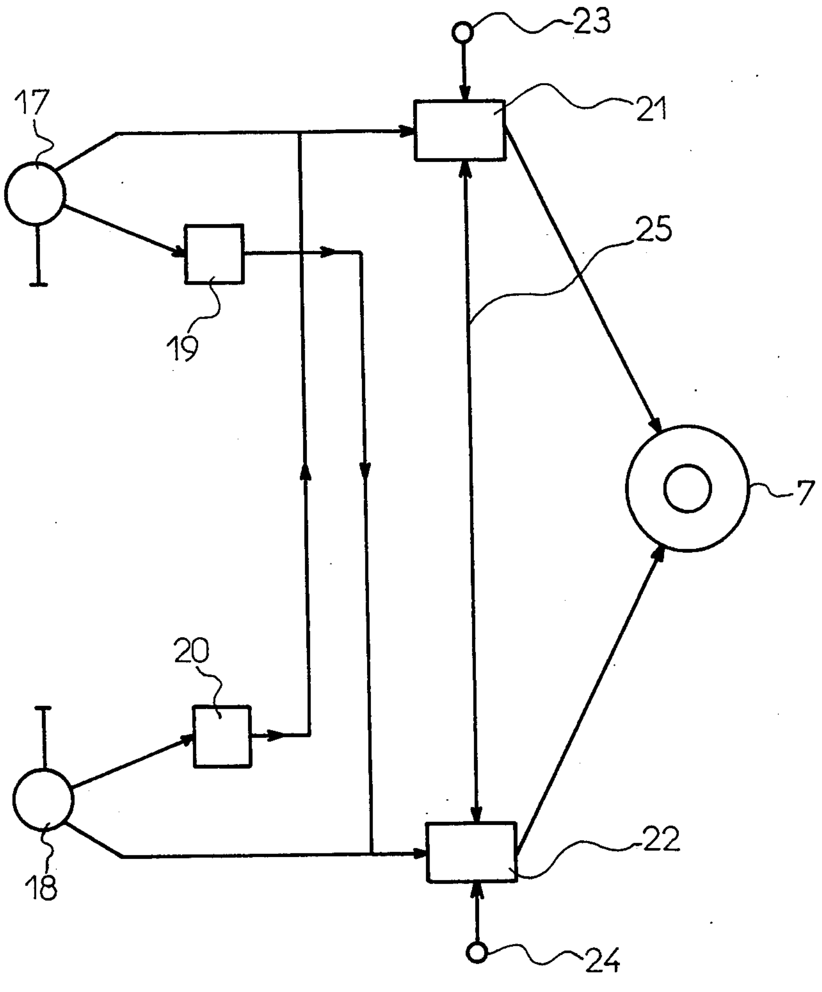

On FIG. 2, which is a schematic diagram of the electrical circuit associated with limit switches (17) and (18) and the motor (7), numerals (19) and (20) refer to electromechanical time-delay devices, and numerals (21) and (22) refer to control relays of the electrical supply of the motor (7), in one or the other direction of rotation. Relays (21) and (22) are equipped with "on-off" switches (23) and (24), and also with a safety connection (25), preventing the motor (7) from starting off simultaneously in both directions.

The functioning of the apparatus is as follows: The unit (2, 1) travelling upwards, for example, the abutment (10) comes to meet, with its upper push piece (11), the upper limit switch (17). This then cuts off, through relay (21), the electrical supply of motor (7) and switches on the time-delay device (19). The moving unit formed on one hand by the translating masses (1, 2, 6) and on the other by the rotating masses (4, 5, 9, 7) has great kinetic energy, which compresses spring (13) against upper stop (15). This spring (13), after maximum compression, springs out and pushes the masses back in the other direction, i.e. in particular, the spraying unit (1, 2). After the chosen time-delay, corresponding, as a rule, to the moment when unit (1, 2) has reached the speed of the same value as in the other direction at the accosting point of stop (15), the time-delay device (19) supplies relay (22), which switches on again the electrical supply to the motor (7), with the rotating direction opposite to that before. The phenomenon is repeated in the same way when spring (14) meets lower stop (16) and when limit switch (18) is met by the lower abutment (12) of the contact bar (10). Time-delay device (20) and relay (22) then have the same roles as relays (19) and (21) of the previous case.

Although contact between the abutment (11) and limit switch (17) has been shown on the drawing to occur simultaneously with contact between spring (13) and abutment (15), it is obvious that a slight time-lag may, if desired, be introduced between these. For example, to take the friction into account, limit switch (17) can be advantageously engaged after the contact between the spring (13) and the stop (15) and the delay due to time-delay device (19) be fixed so that motor (7) is started off again slightly before unit (2, 1), on its way downwards, has reached accosting the accosting point at which (13) and (15) separate.

FIGS. 3*a* and 3*b* show one possible way of putting into effect the schematic diagram of FIG. 2.

On FIG. 3*a*, we may recognize motor (7), supplied by alternating three-phase current from terminals (26, 27 and 28). The relay coils (21) and (22) make it possible to act respectively on a three-way reversing switch (29, 30), whose role is to reverse, as known per se, two of the phases of motor (7), and thus to change its direction of rotation.

On FIG. 3*b*, there may be seen, supplied by uniphase current, for example, between terminals (26) and (27), in series with an "off" push-button (41):

the relay coil (21), in series with a switch (31) and a contact (32) of time-delay device (20);

the relay coil (22), in series with a switch (33) and a contact (34) of the time-delay device (19). The switch (31) and contact (34), as also switch (33) and contact (32) are mechanically connected in such a way that one is open when the other is closed, and vice versa, as is shown on the drawing:

the coil of time-delay device (19), in series on one hand with a contact (35) of the upper contactor (17), and on the other hand with a contact (36) of the said relay (19) and a contact (37) of the lower contactor (18);

the coil of time-delay device (20), in series with on one hand an "ON" push-button, on the other a contact (42) of the lower contactor (18) and finally a contact (39) of the said relay (20) and a contact (40) of the upper contact (17).

The electrical operation corresponding to the diagrams of FIGS. 3*a* and 3*b* is then, in accordance with the general scheme of FIG. 2, as follows:

At the starting-point, unit (2, 1) is in any position between stops (15) and (16). The motor (7) is not supplied, the positions of all the contacts being those shown on FIGS. 3*a* and 3*b*.

To start up the installation, it is necessary to close the starting switch (38), which supplies the coil of time-delay relay (20). After the time-delay, contacts (39) and (32) close, the closing of contact (32) mechanically causing the switch (33) to be turned on. Contact (32) being closed, the relay (21) allows the motor (7) to be electrically supplied in the upward direction, and the closing of contact (39) then enables the starting switch (38) to be released. Unit (2, 1) is then started up in an upward direction.

When the upper limit switch (17) is closed by the upper abutment (11) of contact bar (10), contact (40) opens, cutting off the supply to the coil of relay (20); this opens contact (32) and thus cuts off the electrical supply of the motor through relay (21), whose coil is no longer supplied, thus releasing the triple contact (29). At the same time, the closing of contact (35) allows the coil of time-delay relay (19) to be supplied. After the time-delay of the latter, contact (34) closes, then mechanically opening contact-breaker (31) and starting up again the electrical supply of the motor (7), in the opposite direction of rotation to previously, through the coil of relay (22), which closes triple contact (30). Simultaneously, the closing of contact (36) allows the supply of the coil of relay (19) to be maintained, and thus, through contact (34), that of the coil of relay (22), so that unit (2, 1) continues to go down as far as the lower point of contact (between 12 and 18), where the cycle begins again in the opposite direction.

It is possible, furthermore, by pressing on the "OFF" switch (41) to cut off the supply to all the relay coils, thus stopping the installation. This may then only be started up again by means of push-button (38).

It will be noticed that, for the example according to FIG. 1, elastic elements (13) and (14) are mounted on the mobile support (2) itself. Obviously, without having any effect on the functioning, these could have been mounted on stops (15) and (16). Likewise, although mechanical springs (13, 14) are shown on FIG. 1, it is obvious that pneumatic, hydraulic etc. springs could also be used.

To give an idea, the applicant, using the device of FIG. 1, was able to manoeuvre a moving unit (1, 2, 6) of a total mass of 40 kilograms, at a speed of 0.7 meters per second over a path of travel less than 1 meter long, with the help of an electric motor of ⅓ h.p., and using no cooling system other than the normal ventilation of the motor, whereas without the apparatus of the invention, a motor of an electric power of 1 h.p. manoeuvring, in the previous conditions, a total mass of 25 kilograms, requires cooling by water circulation.

The system according to FIG. 1 has, nevertheless, a slight drawback: the position of the stops, and thus the travel length of the sprayer, can only be fixed on the spot, and not by remote control: it is thus impossible to program the travel length.

It would of course be possible for the stops to be borne by auxiliary carriages driven by small motors, or else have a series of removable stops which can be selected by electro-magnets, for example, but such devices would be complex and costly.

It is possible to overcome this drawback by not using any stop at the ends of the travel length, but by having the "energy recovery" apparatus of the invention carried by an auxiliary device which is connected on to the moving unit at each end of the run, during the change of direction phases, the said auxiliary device being independent of the said moving unit during all the rest of the to-and-fro cycle.

Figure 4:
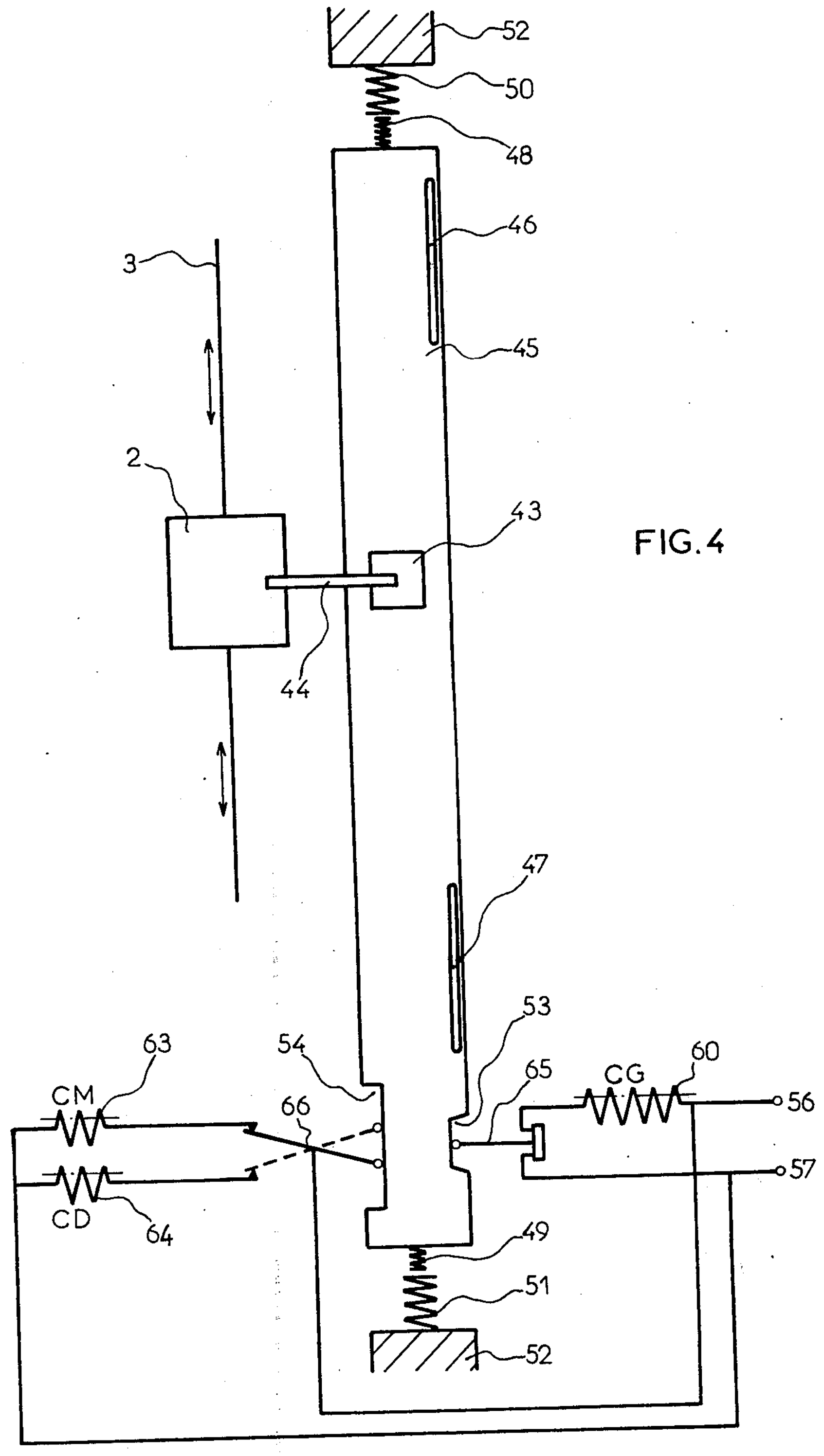
FIGS. 4 and 5 show diagrammatically a second working example of the invention.

FIG. 4 shows diagrammatically such a working example. We may recognize, on this drawing, the moving chain (3) and the support (2) which have been shown very schematically. Numeral (43) refers to one of the two jaws, normally open, of remote control vice or "brake" (44), carried by the moving support (2). The remote control of the vice (44), which may be hydraulic, or electro-magnetic, or electro-pneumatic, has not been shown on the drawing.

Figure 5:
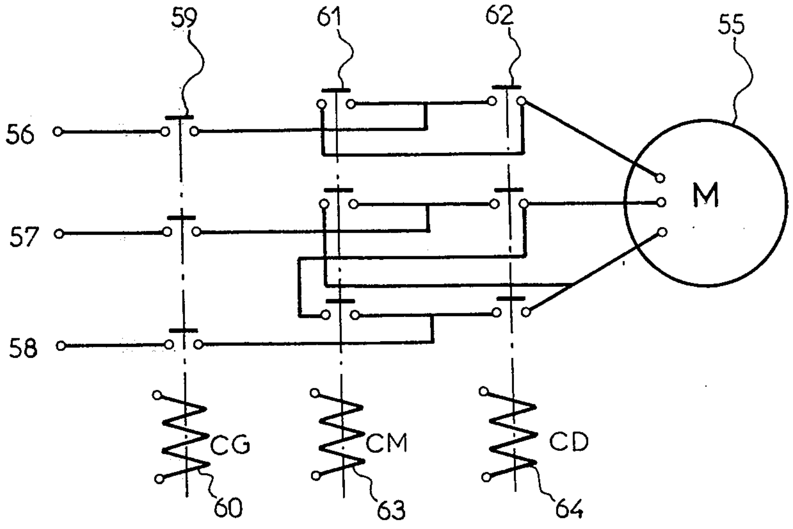

The "energy recovery" apparatus according to the invention, which is thus, during the normal run of the carriage, totally disconnected from it, is shown on the right side of the drawing and comprises:

- a longitudinal rail (45) made of light material, such as an aluminium alloy, parallel to the chain (3), provided with two guiding slits (46) and (47) and held in position with the help of two small springs (48) and (49), also necessary to speed up the rail before the approach point;
- two springs, or "energy recovering" elastic elements (50) and (51), similar to springs (13) and (14) of FIG. 1, fixed to the frame (52) of the installation, each carrying one small spring, respectively (48) and (49);
- an electromechanical device, for the electrical operation of the invention, to be explained hereafter, with the help also of FIG. 5.

The operation of the apparatus according to FIGS. 4 and 5 is as follows:

Let us suppose that the moving unit is going upwards and it is wished to stop it and make it set off again in the other direction. A closing signal is sent to the vice (43, 44): the support (2) is then coupled to the rail (45) and moves it along towards the "recovery" spring (50), as previously. At the same time, the electrical disconnection and reconnection sequence is ensured as previously, thanks to, for example, a notched segment (53, 54), near the lower end of the rail (45), and which will be explained below. Obviously, when the electric motor is reconnected, the closing signal of the vice (44, 43) is simultaneously withdrawn, so that the moving support (2) is again disconnected from the rail (45). The sequence is repeated in the "down" position, and so on. Thus it is possible to program at will the run of the sprayer.

Although an electro-magnetic device such as in FIGS. 2 and 3, but set off by the rail (45) when it begins to move, could be used here, it was found to be cheaper, in this particular case, to use time-delay devices consisting of notches (53) and (54) in the lower part of rail (45). On FIG. 5, the electric motor (55) has been shown supplied by alternating three-phase current by terminals (56), (57) and (58). A triple switch (59), controlled by a relay coil (60), enables the electric supply of motor (55) to be turned on and off. As previously, the direction of rotation of the motor (55) may be changed by means of triple switches (61) and (62) controlled by relay coils (63) and (64).

Coming back to FIG. 4, we may find, supplied for example between terminals (56) and (57):

- relay coil (60) in series with a switch (65) whose end is normally positioned inside notch (53) as is shown on the drawing;
- relay coils (63) and (64) which can be connected selectively by means of a two-way switch, whose end is positioned inside notch (54), as shown on the drawing.

The electromechanical working of the device is as follows:

The carriage (2) going for example upwards, relay coils (60) and (63) are supplied as shown on FIG. 4. When the closing signal is sent to vice (44, 43), the rail (45) starts upwards. After a short run while the little spring (48) is being compressed and during which the rail (45) gathers speed, the rail (45) and thus the moving unit, begins to compress the spring (50). Simultaneously, as is seen on the drawing, the switch (65), whose end has reached the lower end of the notch (53), is opened by pressure to the right, which cuts off the supply of relay coil (60) and thus that of motor (55) through switch (59). The moving unit goes on, compressing spring (50), and the bottom part of the notch (54) makes the switch (66) swing into the position shown on the drawing by a broken line. When, by the force of spring (50), the moving-unit is sent back downwards and ceases to compress spring (50), the end of switch (65) goes back into notch (53), and this starts up the motor (55) in the downward direction. Simultaneously, by a controlling device not shown (operated for example by a conventional time-delay device), the closing signal to the jaws (43) of the vice (44) is removed and the carriage (2) is again disconnected from the rail (45).

It will be noticed that, in the examples described up to now, the effort for stopping and starting off again the translating and rotating masses has been borne by the parts connected with the translation: the frame, chain, guiding columns. This is normal since, in the said examples, the "energy recovery" in fact takes place on the translating movement.

In the cases where it is wished to lessen the strain on these parts, i.e. above all to avoid making them too big, the "energy recovery" according to the invention can be easily carried out on the rotating unit. Very numerous devices may be imagined for this and we will describe only a few here very schematically.

Figure 6:
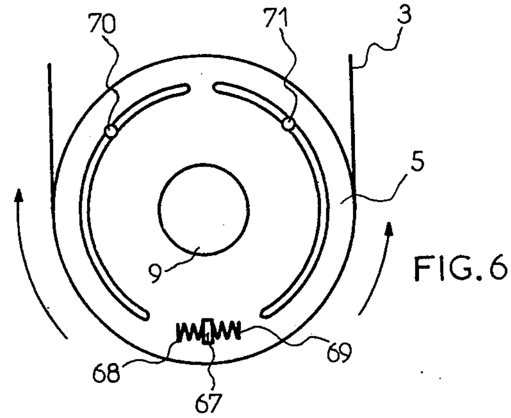
FIGS. 6, 7, 8, 9, 10 and 11 show diagrammatically six other variants of the invention where only the mechanical circuits for 'energy recovery' have been represented.

FIG. 6 shows an example, only valid for short runs of the sprayers, in which the lower wheel (5) moving along the chain (3) is equipped with a fixed stop (67) supporting the "recovery springs" (68) and (69), and the frame is provided with two stops (70) and (71) whose position is adjustable, as shown on the drawing. As for the rest, the electro-mechanical circuits are indentical to those in FIG. 1.

Figure 7:
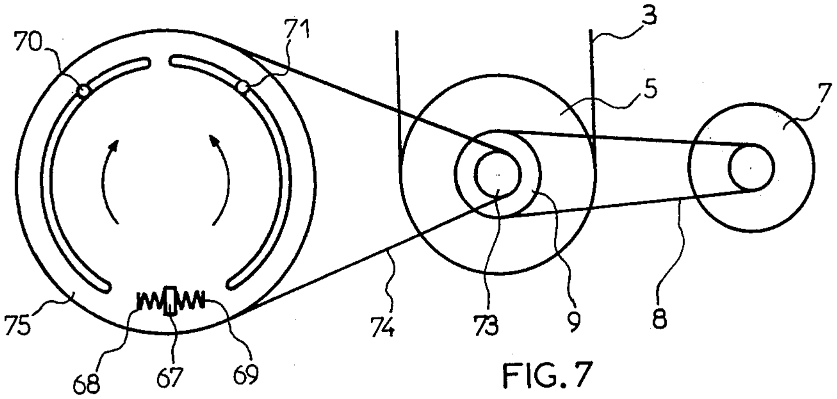

FIG. 7 shows a variant of the device of FIG. 6, which can be used for longer runs: in this example an auxiliary reduction is carried out, i.e. the system as in FIG. 6 is supported by an extra axle which makes at the most one turn, whatever the travel length of the sprayer. On the drawing we may be recognise the motor (7), its reducing wheel (9), its belt (8), the chain (3) and its driving wheel (5). An extra reduction has been carried out, in addition, thanks to a small wheel (73), a belt (74) and a large wheel (75) bearing the same "energy recovery" elements as those of FIG. 6, and which have been shown by the same numerals.

It is obvious that in the examples of FIGS. 6 and 7, the "recovery" springs (68) and (69) may be fixed on stops (70) and (71) instead of on stop (67). It is obvious, besides, that stops (70) and (71) may be replaced by just one stop, for example diametrically opposed to stop (67).

Figure 8:
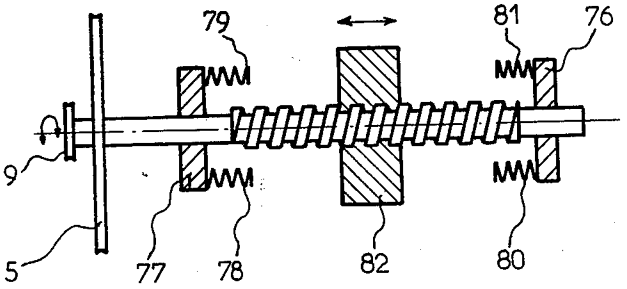

FIG. 8 shows the use of a to-and-fro nut-and-screw system, i.e. with the angle of the thread being about 45°, the said system being carried by the same shaft as wheels (9) and (5). It is formed, as clearly shown on the drawing, by stops (76) and (77) whose position is adjustable, to which are fixed "energy recovery" springs (78), (79), (80), (81), and between which a nut (82) moves linearly, as the screw turns in one direction or the other. "Energy recovery" then takes place, at each end, by the springs being compressed by nut (82). Of course the springs could be carried just as well by the nut (82) as by the stops.

Figure 9:
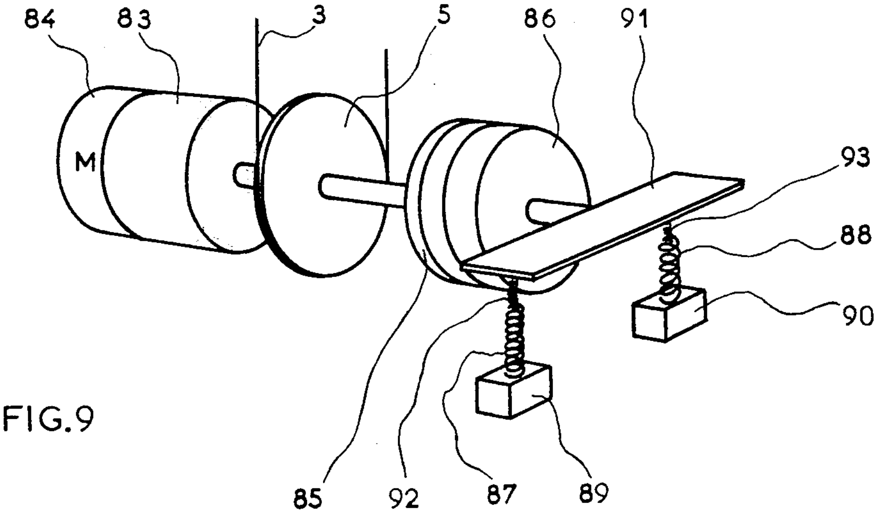

FIG. 9 shows diagrammatically another working example, in which the "energy recovery" is carried out on the rotating unit, but in which the travel length of the sprayer may be remote-controlled by means of a connecting device similar to that of FIG. 4. For this, the reducer (83) equipping motor (84) has been provided with a remote-controlled "brake" (85), whose stator (86) can make a slight movement during which it compresses, thanks to a small board (91), one of the "recovery" elements, such as the springs (87) and (88), each of them being fixed to supports (89) and (90) attached to the frame. As previously, the board (91) is held in place, when "disconnected", by small springs (92) and (93). The electro-mechanical apparatus associated is similar to that associated with the device in FIG. 1, but is started up by the moving off of board (91).

Figure 10:
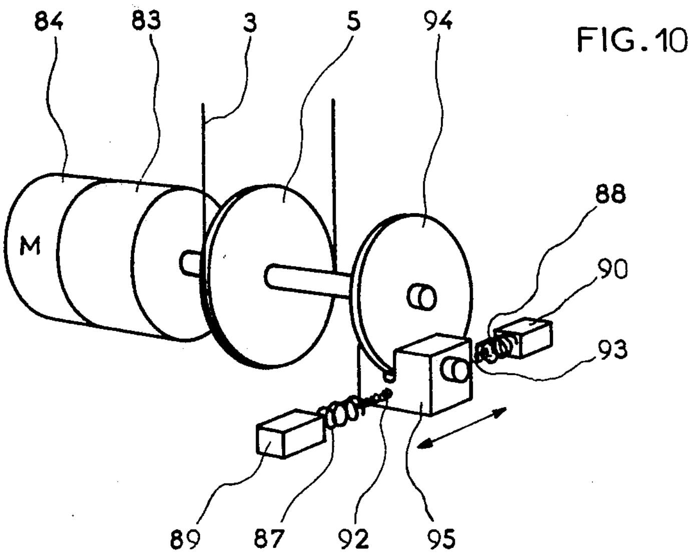

FIG. 10 shows diagrammatically a variant of the device of FIG. 9, in which the "brake" used is of the "disk brake" type, equipped with a braking disk (94) and remote-controlled jaws (95), having the same róle as the board (91) of the device of FIG. 9. The other parts are identical to those of FIG. 9 and have been referred to by the same numerals.

Figure 11:
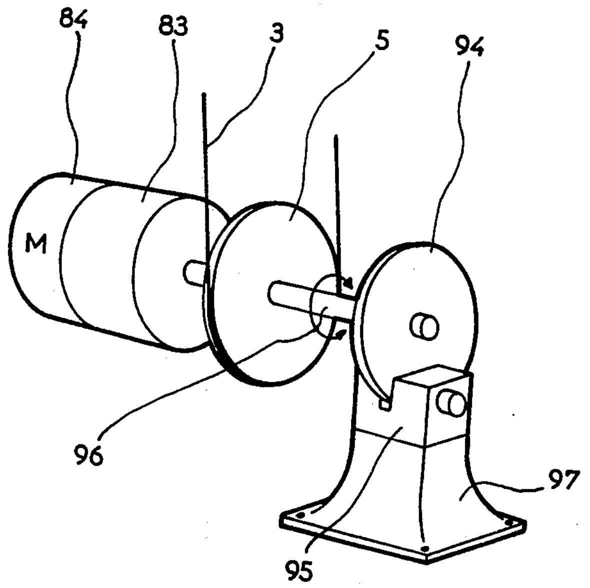

The working example of FIG. 11 differs from that of FIG. 10 in that the braking jaws (95) are solidly attached to a fixed base (97) and in that the coupling of the motor-reducer-wheel unit (84, 83, 5) and the "disk" (94) is carried out with the help of a torsion bar (96) which then plays the role of the elastic element of the invention.

The invention may be used for reciprocators equipping automatic sprayers for coating objects, and is particularly intended for the industry of surface coating by painting, powder-coating or enamelling.

What we claim is:

1. A method for controlling the displacement of a reciprocating unit from one end to another of a path of travel and driven by an electric motor energized from an electrical supply, which method comprises:

positively driving the reciprocating unit between two predetermined points intermediate the ends of the path of travel; and adjacent each point, cutting off the electrical supply to said motor when the reciprocating unit is in the vicinity of one of said points and is moving in a direction away from the other of said points;

then slowing the reciprocating unit with an elastic device and thereby coverting kinetic energy of said reciprocating unit into potential energy stored in said elastic device;

returning the reciprocating unit to the vicinity of said one predetermined point with the potential energy stored in said elastic device thereby converting the potential energy of the elastic device into kinetic energy of the reciprocating unit;

then reconnecting the electrical supply to said motor; and positively driving the reciprocating unit towards the other predetermined point.

2. A method according to claim 1, wherein the direction of the output of the motor is reversed in the interval between the cutting off and subsequent reconnection of the electrical supply to said motor.

3. A method according to claim 1, wherein the positively driven portion of the path of travel of said reciprocating unit is at constant linear velocity.

4. Method as claimed in claim 1 in which the electrical supply to said motor is cut off slightly after said reciprocating unit reaches said predetermined point and in which it is switched on again slightly before said reciprocating unit returns to said predetermined point.

5. Method as claimed in claim 1 in which the electrical supply to the motor is cut off exactly at each of said predetermined points and then switched on again slightly before the reciprocating unit returns to the same predetermined point.

6. Method as claimed in claim 1 in which said motor drives said reciprocating unit through reciprocating drive transmission means and said elastic device acts on said reciprocating drive transmission means.

7. Method as claimed in claim 1 in which said motor drives said reciprocating unit through rotary drive transmission means and said elastic means has a rotary movement and acts on said reciprocating drive transmission means.

8. Method as claimed in claim 1 in which said motor drives said reciprocating unit through intermediate drive transmission means and said elastic means acts on said intermediate drive transmission means only as it approaches the ends of its path of travel.

9. A method according to claim 1 wherein said step of positively driving the reciprocating unit towards the other predetermined point comprises driving said unit along a portion of the length between said points wholly free of the action of the elastic device.

10. Apparatus for controlling the displacement of a reciprocating unit positively driven by an electric motor between predetermined points along a path of travel the ends of which are disposed beyond said respective predetermined points comprising:

elastic means operable generally between each said predetermined point and an associated end of said path of travel for converting kinetic energy of the positively driven reciprocating unit into potential energy by stressing the elastic means, said elastic means in turn reconverting the potential energy stored therein into kinetic energy for moving the reciprocating unit back to the vicinity of the predetermined point;

means for cutting off electrical supply to said motor when the reciprocating unit is in the vicinity of one of said predetermined points and moving in a direction away from said other predetermined point and for reconnecting the electrical supply to the motor when the reciprocating unit is brought back to the vicinity of said one predetermined point by said elastic means and is moving towards said other predetermined point.

11. Apparatus according to claim 10, further comprising means for reversing the direction of the output of the motor when the reciprocating unit is in an interval between a said predetermined point and its associated end of the path of travel.

12. Apparatus according to claim 10 wherein said elastic means comprises elastic means acting on said reciprocating unit only between locations adjacent said predetermined points and the associated ends of the path of travel of the unit.

13. Apparatus as claimed in claim 10 in which said elastic means are mounted on said reciprocating unit and compressed at each end of said path of travel against corresponding fixed stops.

14. Apparatus as claimed in claim 10 in which said elastic means are mounted on a stationary base and encounter stops on said reciprocating unit when said reciprocating unit reaches said predetermined points.

15. Apparatus as claimed in claim 10 comprising intermediate driving means through which said motor drives said reciprocating unit, and a remotely controlled connecting device for connecting said reciprocating unit to said intermediate driving means.

16. Apparatus as claimed in claim 15 in which said elastic means forms part of said connecting device.

17. Apparatus as claimed in claim 10 comprising an electromechanical circuit for connecting and disconnecting said motor tc said reciprocating unit.

18. Apparatus as claimed in claim 17 comprising additional electromechanical means for controlling the circuit for connecting and disconnecting said motor to said reciprocating circuit.

* * * * *